United States Patent
Li et al.

(10) Patent No.: US 10,917,437 B2
(45) Date of Patent: *Feb. 9, 2021

(54) CONFLICT DETECTION AND RESOLUTION METHODS AND APPARATUSES

(71) Applicant: HUAWEI TECHNOLOGIES CO., LTD., Shenzhen (CN)

(72) Inventors: Jinming Li, Beijing (CN); Donghui Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,208

(22) Filed: Jun. 22, 2018

(65) Prior Publication Data

US 2018/0302447 A1 Oct. 18, 2018

Related U.S. Application Data

(63) Continuation of application No. 14/982,363, filed on Dec. 29, 2015, now Pat. No. 10,044,759, which is a (Continued)

(30) Foreign Application Priority Data

Oct. 31, 2013 (CN) .......................... 2013 1 0532941

(51) Int. Cl.
*H04L 29/06* (2006.01)
*H04L 12/751* (2013.01)

(52) U.S. Cl.
CPC .............. *H04L 63/20* (2013.01); *H04L 45/02* (2013.01); *H04L 63/02* (2013.01); *H04L 63/0236* (2013.01); *H04L 63/0263* (2013.01)

(58) Field of Classification Search
CPC ...................................................... H04L 63/20
See application file for complete search history.

(56) References Cited

U.S. PATENT DOCUMENTS 7,441,022 B1  10/2008  Schuba et al.
8,693,344 B1 *  4/2014  Adams ............... H04L 41/0893
                                                        370/241

(Continued)

FOREIGN PATENT DOCUMENTS

CN  1725736 A  1/2006
CN  101005712 A  7/2007

(Continued)

OTHER PUBLICATIONS

Benelbahri, Mohammed Anis, and Adel Bouhoula. "Tuple based approach for anomalies detection within firewall filtering rules." 2007 12th IEEE Symposium on Computers and Communications. IEEE, 2007. (Year: 2007).*

(Continued)

*Primary Examiner* — Madhuri R Herzog
(74) *Attorney, Agent, or Firm* — Kilpatrick Townsend & Stockton LLP

(57) ABSTRACT

Conflict detection and resolution methods and apparatuses relate to the field of communications technologies. The conflict detection method includes: acquiring, by a controller, a flow path of a data flow on a network, where the flow path is used to indicate a path along which the data flow reaches an address in a destination address range from an address in a source address range through at least two intermediate nodes on the network, a first flow table rule is added to or deleted from flow tables of the at least two intermediate nodes, and the first flow table rule is any flow table rule; and determining, by the controller, whether a (Continued)

conflict exists according to an address range of the flow path and an address range of a security policy.

14 Claims, 8 Drawing Sheets

Related U.S. Application Data continuation of application No. PCT/CN2014/080558, filed on Jun. 24, 2014.

(56) References Cited

U.S. PATENT DOCUMENTS

| | | | |
|---|---|---|---|
| 2005/0276262 | A1 | 12/2005 | Schuba et al. |
| 2009/0282478 | A1 | 11/2009 | Jiang |
| 2010/0192225 | A1 | 7/2010 | Ma et al. |
| 2011/0205931 | A1 | 8/2011 | Zhou et al. |
| 2012/0109913 | A1 | 5/2012 | Rajure et al. |
| 2012/0117617 | A1 | 5/2012 | Krupp et al. |
| 2012/0185856 | A1 | 7/2012 | Ashihara et al. |
| 2014/0075498 | A1* | 3/2014 | Porras ............ H04L 63/107 726/1 |
| 2014/0075519 | A1 | 3/2014 | Porras et al. |
| 2015/0350156 | A1 | 12/2015 | Ma et al. |

FOREIGN PATENT DOCUMENTS

| | | | |
|---|---|---|---|
| CN | 101132336 | A | 2/2008 |
| CN | 101179492 | A | 5/2008 |
| CN | 101753369 | A | 6/2010 |
| CN | 101827084 | A | 9/2010 |
| CN | 102474499 | A | 5/2012 |
| CN | 102576343 | A | 7/2012 |
| CN | 102685006 | A | 9/2012 |
| CN | 103051557 | A | 4/2013 |
| CN | 103067534 | A | 4/2013 |
| EP | 2023567 | B1 * | 3/2011 ............ H04L 63/20 |

OTHER PUBLICATIONS

Had, Adiseshu, Subhash Suri, and Guru Parulkar. "Detecting and resolving packet filter conflicts." Proceedings IEEE Infocom 2000. Conference on Computer Communications. Nineteenth Annual Joint Conference of the IEEE Computer and Communications Societies (Cat. No. 00CH37064). vol. 3. IEEE, 2000. (Year: 2000).*
H. Hamed and E. Al-Shaer, "Taxonomy of conflicts in network security policies," in IEEE Communications Magazine, vol. 44, No. 3, pp. 134-141, Mar. 2006, doi: 10.1109/MCOM.2006.1607877. (Year: 2006).*
Philip Porras et al.,"A Security Enforcement Kernel for OpenFlow Networks",HotSDN'12, Aug. 13, 2012,total 6 pages.
Peyman Kazemian et al.,"Header Space Analysis: Static Checking for Networks",dated 2012,total 14 pages.
Peyman Kazemian et al.,"Real Time Network Policy Checking using Header Space Analysis",USENIX Association, dated 2013,total 13 pages.
XP032550794 Kim Taejin et al.,"An efficient packet processing protocol based on exchanging messages between switches and controller in OpenFlow networks",dated Oct. 21, 2013 ,total 6 pages.
XP015095831. Qiang A Kavanagh Ericsson Z: "Security Requirements of NVO3; draft-zu-nvo3-security-requirements-00.txt", dated Oct. 21, 2013 ,total 16 pages.
Ferraresi, Simone, et al. "Automatic conflict analysis and resolution of traffic filtering policy for firewall and security gateway." Communications, 2007. ICC'07. IEEE International Conference on. IEEE, 2007. (Year: 2007),total 7 pages.
Hu, Hongxin et al.,"Detecting and resolving firewall policy anomalies." IEEE Transactions on dependable and secure computing 9.3 (2012): P318-P331.(Year: 2012),total 14 pages.
Al-Shaer, Ehab. et al. "Conflict classification and analysis of distributed firewall policies." IEEE journal on Selected Areas in Communications 23.10 (2005): P2069-P2084 (Year: 2005),total 16 pages.
Abedin, Muhammad et al. "Detection and resolution of anomalies in firewall policy rules." IFIP Annual Conference on Data and Applications Security and Privacy. Springer, Berlin, Heidelberg, 2006. (Year: 2006),total 15 pages.
Al-Shaer et al., "Discovery of policy anomalies in distributed firewalls." INFOCOM 2004. Twenty-third AnnualJoint Conference of the IEEE Computer and Communications Societies. vol. 4. IEEE, 2004,total 12 pages.
Ahmed Khurshid et al.,"VeriFlow: Verifying Network-Wide Invariants in Real Time",In Proceedings of ACM Sigcomm HotSDN Workshop, 2012,total 13 pages.
Seungwon Shin et al.,"AVANT-GUARD: Scalable and Vigilant Switch Flow Management in Software-Defined Networks",dated 2013,total 12 pages.
Seugwon Shin et al: "FRESCO: Modular Composable Security Services for Software-Defined Networks", NDSS Symposium 2013, Apr. 23, 2013, pp. 1-16, XP055422187.
Hongxin Hu et al.,"FLOWGUARD: Building Robust Firewalls for Software-Defined Networks",Workshop on Hot Topics in Software Defined Networking,dated 2010,total 6 pages.
OpenFlow Switch Specification Version 1.3.3 (Protocol version 0x04),dated Sep. 27, 2013,total 165 pages.

* cited by examiner

CONFLICT DETECTION AND RESOLUTION METHODS AND APPARATUSES

CROSS-REFERENCE TO RELATED APPLICATIONS

This application is a continuation of U.S. patent application Ser. No. 14/982,363, filed on Dec. 29, 2015, which is a continuation of International Application No. PCT/CN2014/080558, filed on Jun. 24, 2014, which claims priority to Chinese Patent Application No. 201310532941.5, filed on Oct. 31, 2013. All of the afore-mentioned patent applications are hereby incorporated by reference in their entireties.

TECHNICAL FIELD

The present invention relates to the field of communications technologies, and in particular, to conflict detection and resolution methods and apparatuses.

BACKGROUND

In a traditional network, a data layer and a control layer exist in a switch or a router, but in SDN (Software-Defined Networking, software-defined networking), a data layer and a control layer of a network are separated, and the control layer is moved to a separate device such as a controller, where the control layer controls a flow table in an OpenFlow switch by using the OpenFlow protocol, so as to implement centralized control over the entire network. The controller may be an apparatus, a virtual machine, or a physical server, and control network communication by using the OpenFlow protocol.

Currently, there is no audit and track mechanism specific for a flow table in the existing OpenFlow standard, and therefore, in a manner of rewriting a source address range and a destination address range of a current flow table by adding a flow table rule to a switch, it is easy for an address range of a data flow in the current flow table to bypass an SDN firewall. To resolve the problem in changing an address range of a conflict data flow by adding a flow table rule to a switch, a conflict data flow is blocked by expanding a source address range and a destination address range of a security policy in the prior art.

However, the method used in the prior art considers a flow table rule only in one switch, that is, if an address of a data flow is rewritten on a switch during transmission, blocking is performed on the switch according to a security policy, and the problem is not resolved from an overall perspective of a path of a data flow on an entire network.

SUMMARY

Embodiments of the present invention provide conflict detection and resolution methods and apparatuses, to block a conflict data flow from an overall perspective of a path of a data flow on an entire network.

To achieve the foregoing objective, the embodiments of the present invention use the following technical solutions:

According to a first aspect, a conflict detection method is provided, where the method includes: acquiring, by a controller, a flow path of a data flow on a network, where the flow path is used to indicate a path along which the data flow reaches a destination address range from a source address range through at least two intermediate nodes on the network, a first flow table rule is added to or deleted from flow tables of the at least two intermediate nodes, and the first flow table rule is any flow table rule; and determining, by the controller, whether a conflict exists according to an address range of the flow path and an address range of a security policy.

In a first possible implementation manner of the first aspect, the method further includes:

the security policy includes current firewall rules and current valid deny rules of a firewall.

In the first possible implementation manner of the first aspect, a second possible implementation manner of the first aspect is further provided, the determining whether a conflict exists according to an address range of the flow path and an address range of a security policy specifically includes:

determining whether a conflict exists according to the address range of the flow path and an address range of the current firewall rules.

In the second possible implementation manner of the first aspect, a third possible implementation manner of the first aspect is further provided, the determining whether a conflict exists according to the address range of the flow path and an address range of the current firewall rules specifically includes:

determining whether the address range of the flow path and the address range of the current firewall rules have an intersection set, where if an intersection set exists, the flow path conflicts with the current firewall rules; and if no intersection set exists, the flow path does not conflict with the current firewall rules.

In the first possible implementation manner of the first aspect, a fourth possible implementation manner of the first aspect is further provided, after the acquiring a flow path of a data flow on a network, the method further includes:

generating the current valid deny rules of the firewall according to the current firewall rules.

In the fourth possible implementation manner of the first aspect, a fifth possible implementation manner of the first aspect is further provided, the determining whether a conflict exists according to an address range of the flow path and an address range of a security policy specifically includes:

determining whether a conflict exists according to the address range of the flow path and an address range of the current valid deny rules of the firewall.

In the fifth possible implementation manner of the first aspect, a sixth possible implementation manner of the first aspect is further provided, the determining whether a conflict exists according to the address range of the flow path and an address range of the current valid deny rules of the firewall specifically includes:

determining whether the address range of the flow path and the address range of the current valid deny rules of the firewall have an intersection set, where if an intersection set exists, the flow path conflicts with the current valid deny rules of the firewall; and if no intersection set exists, the flow path does not conflict with the current valid deny rules of the firewall.

In the fourth possible implementation manner of the first aspect, a seventh possible implementation manner of the first aspect is further provided, the generating the current valid deny rules of the firewall according to the current firewall rules specifically includes:

classifying the current firewall rules into a deny rule set and a permit rule set;

determining whether a priority of the permit rule set is higher than a priority of the deny rule set;

if a determining result is yes, calculating an intersection set of an address range of the permit rule set and an address range of the deny rule set, to obtain a first intersection set;

acquiring a difference between the deny rule set and the first intersection set, to obtain the current valid deny rules of the firewall; or if a determining result is that the priority of the set of permission rules is not higher than the priority of the set of negation rules, determining that the deny rule set are the current valid deny rules of the firewall; or in the deny rule set, determining whether an address range of a first deny rule and an address range of a second deny rule have a second intersection set, where the first deny rule and the second deny rule are any two deny rules in the deny rule set;

if the address range of the first deny rule and the address range of the second deny rule have a second intersection set, determining whether a priority of the first deny rule is higher than a priority of the second deny rule;

if a determining result is yes, acquiring a difference between the address range of the second deny rule and the second intersection set, to obtain the current valid deny rules of the firewall; or if a determining result is no, acquiring a difference between the address range of the first deny rule and the second intersection set, to obtain the current valid deny rules of the firewall; or if the address range of the first deny rule and the address range of the second deny rule have no second intersection set, determining that the deny rule set are the current valid deny rules of the firewall.

In an eighth possible implementation manner of the first aspect, after the acquiring a flow path of a data flow on a network, the method further includes:

determining whether a first firewall rule is to be added to or deleted from firewall rules, where the first firewall rule is any firewall rule; and if a determining result is yes, determining that firewall rules after the first firewall rule is added or deleted are the current firewall rules; or if a determining result is no, determining that the firewall rules are the current firewall rules.

In a ninth possible implementation manner of the first aspect, the acquiring a flow path of a data flow on a network further includes:

acquiring an address range of the data flow according to packet header information of the data flow;

generating, according to the address range of the data flow and current flow tables of the at least two intermediate nodes, transformation functions used to form the flow path, where the current flow tables are flow tables in which the first flow table rule is added or deleted; and generating the flow path according to the transformation functions.

In the first aspect or any one of the first nine possible implementation manners of the first aspect, a tenth possible implementation manner of the first aspect is further provided, the address range of the flow path, the address range of the current firewall rules, the address range of the current valid deny rules of the firewall, the address range of the permit rule set, the address range of the deny rule set, the address range of the first deny rule, and the address range of the second deny rule all include a source address range and/or a destination address range.

According to a second aspect, a conflict detection apparatus is provided, where the method includes: an acquiring unit and a first determining unit, where the acquiring unit is configured to acquire a flow path of a data flow on a network, where the flow path is used to indicate a path along which the data flow reaches a destination address range from a source address range through at least two intermediate nodes on the network, a first flow table rule is added to or deleted from flow tables of the at least two intermediate nodes, and the first flow table rule is any flow table rule; and the first determining unit is configured to determine whether a conflict exists according to an address range of the flow path and an address range of a security policy.

In a first possible implementation manner of the second aspect, the security policy includes current firewall rules and current valid deny rules of a firewall.

In the first possible implementation manner of the second aspect, a second possible implementation manner of the second aspect is further provided, the first determining unit includes a first determining module, and the first determining module is configured to determine whether a conflict exists according to the address range of the flow path and an address range of the current firewall rules.

In the second possible implementation manner of the second aspect, a third possible implementation manner of the second aspect is further provided, the first determining module is configured to determine whether the address range of the flow path and the address range of the current firewall rules have an intersection set, where if an intersection set exists, the flow path conflicts with the current firewall rules; and if no intersection set exists, the flow path does not conflict with the current firewall rules.

In the first possible implementation manner of the second aspect, a fourth possible implementation manner of the second aspect is further provided, the first determining unit further includes: a generation module; and the generation module is configured to generate the current valid deny rules of the firewall according to the current firewall rules.

In the fourth possible implementation manner of the second aspect, a fifth possible implementation manner of the second aspect is further provided, the first determining unit further includes a second determining module, and the second determining module is configured to determine whether a conflict exists according to the address range of the flow path and an address range of the current valid deny rules of the firewall.

In the fifth possible implementation manner of the second aspect, a sixth possible implementation manner of the second aspect is further provided, the second determining module is configured to determine whether the address range of the flow path and the address range of the current valid deny rules of the firewall have an intersection set, where if an intersection set exists, the flow path conflicts with the current valid deny rules of the firewall; and if no intersection set exists, the flow path does not conflict with the current valid deny rules of the firewall.

In the fourth possible implementation manner of the second aspect, a seventh possible implementation manner of the second aspect is further provided, the generation module specifically includes: a classification submodule, a first judging submodule, a first operation submodule, a first determining submodule, a second judging submodule, a third judging submodule, a second operation submodule, and a second determining submodule, where the classification submodule is configured to classify the current firewall rules into a deny rule set and a permit rule set;

the first judging submodule is configured to determine whether a priority of the permit rule set is higher than a priority of the deny rule set;

the first operation submodule is configured to: when a determining result of the first judging submodule is yes, calculate an intersection set of an address range of the permit rule set and an address range of the deny rule set, to obtain a first intersection set; and acquire a difference between the deny rule set and the first intersection set, to obtain the current valid deny rules of the firewall;

the first determining submodule is configured to: when a determining result of the first judging submodule is no, determine that the deny rule set are the current valid deny rules of the firewall;

the second judging submodule is configured to: in the deny rule set, determine whether an address range of a first deny rule and an address range of a second deny rule have a second intersection set, where the first deny rule and the second deny rule are any two deny rules in the deny rule set;

the third judging submodule is configured to: when a determining result of the second judging submodule is yes, determine whether a priority of the first deny rule is higher than a priority of the second deny rule;

the second operation submodule is configured to: when a determining result of the third judging submodule is yes, acquire a difference between the address range of the second deny rule and the second intersection set, to obtain the current valid deny rules of the firewall; or when a determining result of the third judging submodule is no, acquire a difference between the address range of the first deny rule and the second intersection set, to obtain the current valid deny rules of the firewall; and the second determining submodule is configured to: when a determining result of the second judging submodule is no, determine that the deny rule set are the current valid deny rules of the firewall.

In an eighth possible implementation manner of the second aspect, the apparatus further includes: a judging unit, a second determining unit, and a third determining unit, where the judging unit is configured to determine whether a first firewall rule is to be added to or deleted from firewall rules, where the first firewall rule is any firewall rule; and the second determining unit is configured to: if a determining result of the judging unit is yes, determine that firewall rules after the first firewall rule is added or deleted are the current firewall rules; or the third determining unit is configured to: if a determining result of the judging unit is no, determine that the firewall rules are the current firewall rules.

In a ninth possible implementation manner of the second aspect, the acquiring unit specifically includes: an acquiring module, a first generation module, and a second generation module, where the acquiring module acquires an address range of the data flow according to packet header information of the data flow;

the first generation module generates, according to the address range of the data flow and current flow tables of the at least two intermediate nodes, transformation functions used to form the flow path, where the current flow tables are flow tables in which the first flow table rule is added or deleted; and the second generation module generates the flow path according to the transformation functions.

In the second aspect or any one of the first nine possible implementation manners of the second aspect, a tenth possible implementation manner of the second aspect is further provided, the address range of the flow path, the address range of the current firewall rules, the address range of the current valid deny rules of the firewall, the address range of the permit rule set, the address range of the deny rule set, the address range of the first deny rule, and the address range of the second deny rule all include a source address range and/or a destination address range.

The embodiments of the present invention provide a conflict detection method and apparatus, in which a flow path of a data flow on a network is acquired, and whether a conflict exists is determined according to an address range of the flow path and an address range of a security policy. Compared with a manner of performing detection on a node at which a conflict occurs in the prior art, in the embodiments of the present invention, conflict detection is performed based on a change in a flow path, and is not limited to one node; in this way, a conflict can be detected from an overall perspective of an entire transmission path of a data flow on a network.

According to a third aspect, a conflict resolution method is provided, where after the conflict detection method, the conflict resolution method includes:

determining, by a controller, a first intermediate node on a flow path, where the flow path is used to indicate a path along which a data flow reaches a destination address range from a source address range through at least two intermediate nodes on the network;

when a conflict is caused by an added flow table rule, adding, by the controller, the added flow table rule to the first intermediate node;

setting, by the controller, a priority of the added flow table rule to be the highest, so that when the data flow is at the first intermediate node, the added flow table rule is first executed; and setting, by the controller, an operation state of the added flow table rule to discarding, to control the first intermediate node to discard the data.

In a first possible implementation manner of the third aspect, after the determining, by a controller, a first intermediate node on a flow path, the method further includes:

when a conflict is caused by an added firewall rule, when an address range of a flow table rule on the first intermediate node is narrower than an address range of current valid deny rules of a firewall, controlling, by the controller, the first intermediate node to discard the data; or when an address range of a flow table rule on the first intermediate node is wider than an address range of current valid deny rules of a firewall, determining, by the controller, conflict data that conflicts with the current valid deny rules of the firewall in the data flow; and controlling, by the controller, the first intermediate node to discard the conflict data.

In a second possible implementation manner of the third aspect, after the determining, by a controller, a first intermediate node on a flow path, the method further includes:

determining, by the controller according to information reported by the at least two intermediate nodes, whether a conflict is caused by an added flow table rule; and if a determining result is yes, determining that the conflict is caused by an added flow table rule; or if a determining result is no, determining that the conflict is caused by an added firewall rule.

In the second possible implementation manner of the third aspect, a third possible implementation manner of the third aspect is further provided, after the determining that the conflict is caused by an added firewall rule, the method further includes:

determining whether an address range of a flow table rule on the first intermediate node is narrower than an address range of the current valid deny rules of the firewall.

According to a fourth aspect, a conflict resolution apparatus is provided, where the conflict resolution apparatus is connected to the foregoing conflict detection apparatus, and the conflict resolution apparatus includes: a first determining unit, an adding unit, a setting unit, and a first operation unit, where the first determining unit is configured to determine a first intermediate node on a flow path, where the flow path is used to indicate a path along which a data flow reaches a destination address range from a source address range through at least two intermediate nodes on the network;

the adding unit is configured to: when a conflict is caused by an added flow table rule, add the added flow table rule to the first intermediate node;

the setting unit is configured to set a priority of the added flow table rule to be the highest, so that when the data flow is at the first intermediate node, the added flow table rule is first executed; and the first operation unit is configured to set an operation state of the added flow table rule to discarding, to control the first intermediate node to discard the data.

In a first possible implementation manner of the fourth aspect, the apparatus further includes: a second operation unit, a second determining unit, and a third operation unit, where the second operation unit is configured to: when a conflict is caused by an added firewall rule, when an address range of a flow table rule on the first intermediate node is narrower than an address range of current valid deny rules of a firewall, control the first intermediate node to discard the data; or the second determining unit is configured to: when an address range of a flow table rule on the first intermediate node is wider than an address range of current valid deny rules of a firewall, determine conflict data that conflicts with the current valid deny rules of the firewall in the data flow; and the third operation unit is configured to control the first intermediate node to discard the conflict data.

In a second possible implementation manner of the fourth aspect, the apparatus further includes: a first judging unit, where the first judging unit is configured to determine, according to information reported by the at least two intermediate nodes, whether a conflict is caused by an added flow table rule; and if a determining result is yes, determine that the conflict is caused by an added flow table rule; or if a determining result is no, determine that the conflict is caused by an added firewall rule.

In the second possible implementation manner of the fourth aspect, a third possible implementation manner of the fourth aspect is further provided, the apparatus further includes: a second judging unit, where the second judging unit is configured to: when a result of the first judging unit is no, determine whether an address range of a flow table rule on the first intermediate node is narrower than an address range of the current valid deny rules of the firewall.

The embodiments of the present invention provide a conflict resolution method and apparatus, in which a first intermediate node on a flow path of a data flow is determined according to the flow path, and when a conflict is caused by an added flow table rule, the added flow table rule is executed at the first intermediate node. Compared with a manner of performing blocking on a node at which a conflict occurs in the prior art, conflict data is blocked at the first intermediate node that the conflict data passes through on an entire network, and the conflict data is discarded at the first intermediate node, thereby effectively preventing a conflict data flow from being transmitted on the network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
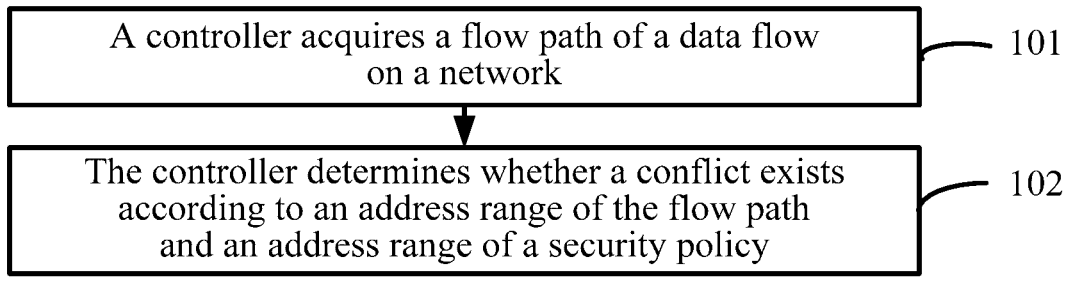
FIG. 1 shows a conflict detection method according to an embodiment of the present invention.

As shown in FIG. 1, the present invention provides a conflict detection method, where the method includes the following steps 101 to 102.

101: A controller acquires a flow path of a data flow on a network, where the flow path is used to indicate a path along which the data flow reaches a destination address range from a source address range through at least two intermediate nodes on the network, a first flow table rule is added to or deleted from flow tables of the at least two intermediate nodes, and the first flow table rule is any flow table rule.

102: The controller determines whether a conflict exists according to an address range of the flow path and an address range of a security policy.

This embodiment of the present invention provides a conflict detection method, in which a flow path of a data flow on a network is acquired, and whether a conflict exists is determined according to an address range of the flow path and an address range of a security policy. Compared with a manner of performing detection on a node at which a conflict occurs in the prior art, in this embodiment of the present invention, conflict detection is performed based on a rewritten flow path, and is not limited to one node; in this way, a conflict can be detected from an overall perspective of an entire transmission path of a data flow on a network.

Embodiment 2

Figure 2:
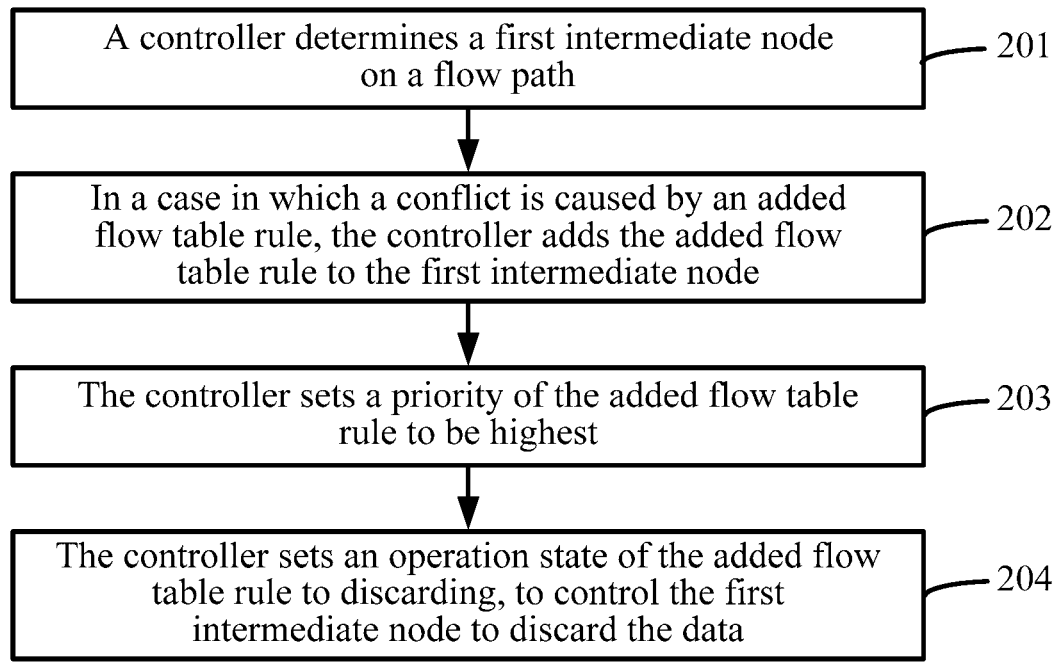
FIG. 2 shows a conflict resolution method according to an embodiment of the present invention.

As shown in FIG. 2, an embodiment of the present invention provides a conflict resolution method, where the method includes:

201: A controller determines a first intermediate node on a flow path, where the flow path is used to indicate a path along which a data flow reaches a destination address range from a source address range through at least two intermediate nodes on the network.

202: When a conflict is caused by an added flow table rule, the controller adds the added flow table rule to the first intermediate node.

203: The controller sets a priority of the added flow table rule to be the highest, so that when the data flow is at the first intermediate node, the added flow table rule is first executed.

204: The controller sets an operation state of the added flow table rule to discarding, to control the first intermediate node to discard the data.

This embodiment of the present invention provides a conflict resolution method, in which a first intermediate node on a flow path of a data flow is determined according to the flow path, and when a conflict is caused by an added flow table rule, the added flow table rule is executed at the first intermediate node. Compared with a manner of performing blocking on a node at which a conflict occurs in the prior art, conflict data is blocked at the first intermediate node that the conflict data passes through on an entire network, and the conflict data is discarded at the first intermediate node, thereby effectively preventing a conflict data flow from being transmitted on the network.

Embodiment 3

Figure 3:
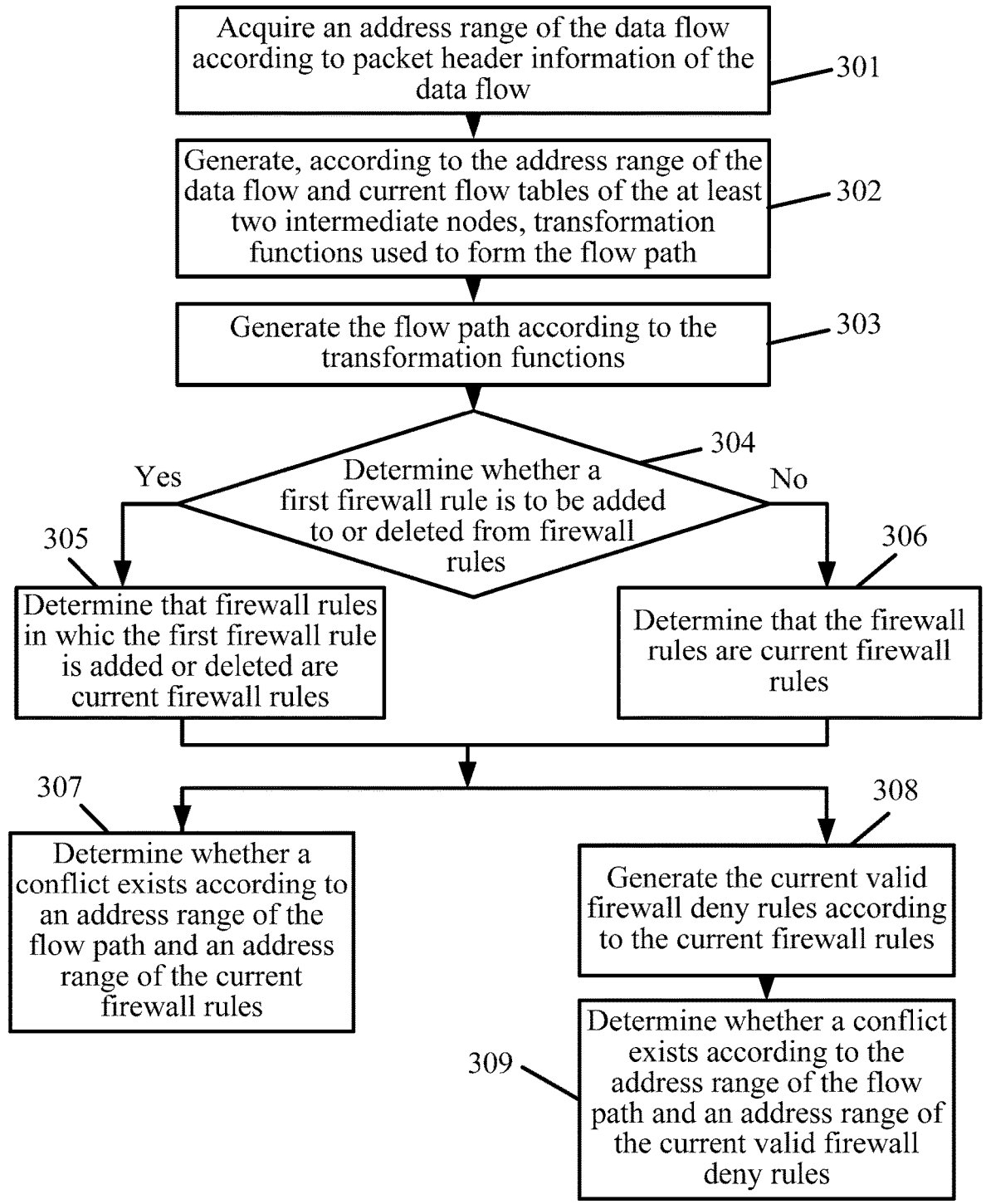
FIG. 3 shows another conflict detection method according to an embodiment of the present invention.

As shown in FIG. 3, the present invention provides a conflict detection method, where the method includes the following steps 301 to 309, and the method is executed by a controller. In the present invention, the controller is a separate device independent of a node on a network, and may be an apparatus, a virtual machine, or a physical server, and controls communication between network nodes by using the OpenFlow protocol. This embodiment of the present invention is applicable to data transmission between nodes in the OpenFlow protocol.

The controller acquires a flow path of a data flow on a network by performing the following steps 301 to 303, where the flow path is used to indicate a path along which the data flow reaches a destination address range from a source address range through at least two intermediate nodes on the network, a first flow table rule is added to or deleted from flow tables of the at least two intermediate nodes, and the first flow table rule is any flow table rule.

In this embodiment of the present invention, after the first flow table rule is added to or deleted from the flow tables of the at least two intermediate nodes, the acquired flow path is a rewritten flow path. The nodes include a switch, a router.

301: Acquire an address range of the data flow according to packet header information of the data flow.

302: Generate, according to the address range of the data flow and current flow tables of the at least two intermediate nodes, transformation functions used to form the flow path, where the current flow tables are flow tables in which the first flow table rule is added or deleted. For example, the controller acquires a series of transformation functions T1, T2, T3 . . . and Tn of the data flow on the network according to the current flow tables on the network, where the transformation functions are rewritten transformation functions exported according to the current flow tables in which the first flow table rule is added or deleted.

For example, malicious software may add or delete any flow table rule to change a flow table used to generate a flow path, and as a result, a transformation function of the flow path generated by using the flow table is rewritten, which further causes rewriting of the flow path of a data flow on a network.

303: Generate the flow path according to the transformation functions. In the present invention, steps 301 to 303 are performed in an HSA (Header Space Analysis, header space analysis) model, where HAS provides a model of processing data by using a binary vector method. The packet header information of the data flow is also represented in binary format, and the address range of the data flow and the transformation functions are input into the HSA model, to acquire the flow path. For example, a data flow reaches a destination address range b from a source address a along a series of transformation functions T1, T2, T3 . . . and Tn acquired in step 302, and a flow path a→S1→S2→S3 . . . Sn→b of the data flow on a network may be acquired by inputting this information to the HSA model, where S1, S2, S3 . . . Sn are intermediate nodes that the data flow passes through.

After the flow path is acquired in step 303, the method further includes 304 to 306, where steps 304 to 306 are used to acquire the current firewall rules.

304: Determine whether a first firewall rule is to be added to or deleted from firewall rules, where the first firewall rule is any firewall rule; and if a determining result is that the first firewall rule is to be added to or deleted from the firewall rules, perform the following step 305; or if a determining result is that the first firewall rule is not to be added to or deleted from the firewall rules, perform the following step 306.

305: Determine that the firewall rules in which the first firewall rule is added or deleted are current firewall rules.

306: Determine that the firewall rules are current firewall rules.

In this way, the current firewall rules are acquired by performing steps 304 to 306; and after the current firewall rules are acquired, a conflict may be detected by performing the following step 307, or a conflict may be detected by performing the following steps 308 to 309.

307: Determine whether a conflict exists according to an address range of the flow path and an address range of the current firewall rules. In this embodiment of the present invention, current firewall rules change after any firewall rule is added or deleted, which affects detection of whether a conflict exists.

Step 307 specifically includes: determining whether the address range of the flow path and the address range of the current firewall rules have an intersection set, where if an intersection set exists, the flow path conflicts with the current firewall rules; and if no intersection set exists, the flow path does not conflict with the current firewall rules.

Figure 4:
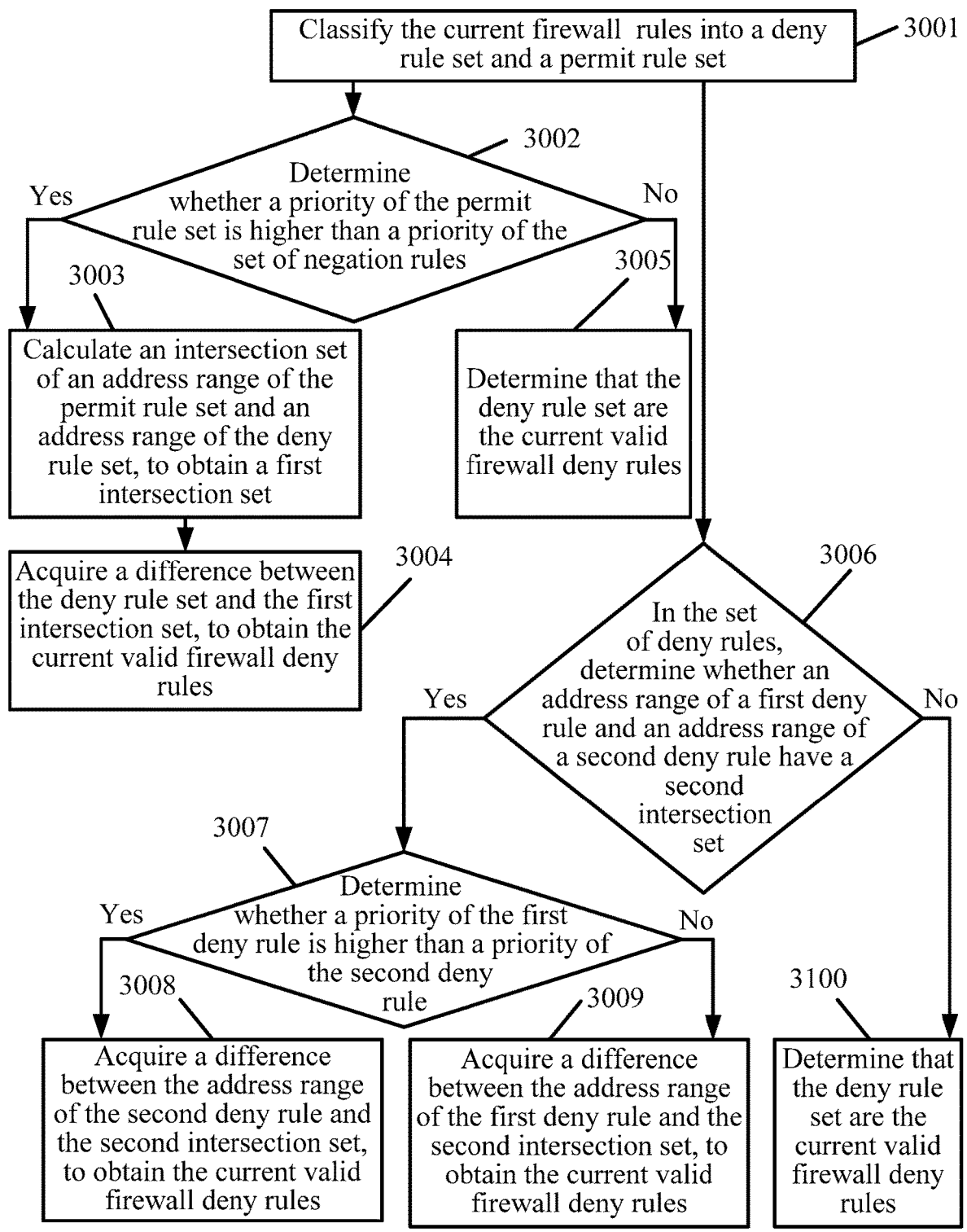
FIG. 4 shows a method for acquiring a current valid firewall deny rule according to an embodiment of the present invention.

308: Generate a current valid deny rules of the firewall according to the current firewall rules. Specifically, as shown in FIG. 4, step 308 is implemented by performing the following steps 3001 to 3100.

3001: Classify the current firewall rules into a deny rule set and a permit rule set. Further, the following steps 3002 to 3005 are performed for operations between the permit rule set and the deny rule set, and the following steps 3006 to 3100 are performed for operations inside the deny rule set.

3002: Determine whether a priority of the permit rule set is higher than a priority of the deny rule set; and if a determining result is that the priority of the set of permission rules is higher than the priority of the set of negation rules, perform the following steps 3003 to 3004; or if a determining result is that the priority of the set of permission rules is not higher than the priority of the set of negation rules, perform the following step 3005.

3003: Calculate an intersection set of an address range of the permit rule set and an address range of the deny rule set, to obtain a first intersection set.

3004: Acquire a difference between the deny rule set and the first intersection set, to obtain the current valid deny rules of the firewall.

3005: Determine that the deny rule set are the current valid deny rules of the firewall.

3006: In the deny rule set, determine whether an address range of a first deny rule and an address range of a second deny rule have a second intersection set, where the first deny rule and the second deny rule are any two deny rules in the deny rule set. Specifically, in a process of implementing step 3006, i is used to represent the first deny rule, where i=0, i++, and i<n, where n is a quantity of deny rules in the deny rule set; and j is used to represent the second deny rule, where j=i+1, j++, and j<n. That is, it is determined whether an address range of the $i^{th}$ deny rule and an address range of the $j^{th}$ deny rule have a second intersection set. If a determining result is that the address range of the first negation rule and the address range of the second negation rule have the second intersection set, perform the following steps 3007 to 3009; or if a determining result that the address range of the first negation rule and the address range of the second negation rule have no second intersection set, perform the following step 3100.

3007: Determine whether a priority of the first deny rule is higher than a priority of the second deny rule; and if a determining result is that the priority of the first negation rule is higher than the priority of the second negation rule, perform the following step 3008; or if a determining result is that the priority of the first negation rule is not higher than the priority of the second negation rule, perform the following step 3009.

3008: Acquire a difference between the address range of the second deny rule and the second intersection set, to obtain the current valid deny rules of the firewall.

3009: Acquire a difference between the address range of the first deny rule and the second intersection set, to obtain the current valid deny rules of the firewall.

3100: Determine that the deny rule set are the current valid deny rules of the firewall.

The current valid deny rules of the firewall are acquired by performing steps 3001 to 3100; and when any firewall rule is added or deleted, the current firewall rules change, which further leads to a change in the acquired current valid deny rules of a firewall. Whether a conflict exists on a network is monitored by fully using a dynamic change in valid deny rules among current firewall rules.

309: Determine whether a conflict exists according to the address range of the flow path and an address range of the current valid deny rules of the firewall.

Step 309 specifically includes: determining whether the address range of the flow path and the address range of the current valid deny rules of the firewall have an intersection set, where if an intersection set exists, the flow path conflicts with the current valid deny rules of the firewall; and if no intersection set exists, the flow path does not conflict with the current valid deny rules of the firewall.

It can be seen that the current valid deny rules of the firewall are a subset of the current firewall rules; and in a process of acquiring the current valid deny rules of the firewall, an association between rules is fully considered, to avoid repeated determining of a conflict within some address ranges. In addition, in a conflict determining process, compared with use of the current firewall rules, use of the current valid deny rules of the firewall reduces calculation amount for the controller, and improves a conflict detection speed.

In this embodiment of the present invention, the address range of the flow path, the address range of the current firewall rules, the address range of the current valid deny rules of the firewall, the address range of the permit rule set, the address range of the deny rule set, the address range of the first deny rule, and the address range of the second deny rule all include a source address range and/or a destination address range. According to a rule in the protocol, it may be that only address ranges of source address ranges are compared, or only address ranges of destination address ranges are compared, or address ranges of source address ranges and address ranges of destination address ranges are simultaneously compared.

It should be noted that for the purpose of brief description, the method embodiments are expressed as a series of action combinations. However, persons skilled in the art should know that the present invention is not limited to an action sequence described, because some steps may be performed in another sequence or simultaneously according to the present invention.

This embodiment of the present invention provides a conflict detection method, in which a flow path of a data flow on a network is acquired, and it is determined whether an address range of the flow path and an address range of current firewall rules have an intersection set, to detect a conflict, or it is determined whether an address range of the flow path and an address range of current valid deny rules of a firewall have an intersection set, to detect a conflict. Compared with a manner of performing detection on a node at which a conflict occurs in the prior art, in this embodiment of the present invention, conflict detection is performed based on a rewritten flow path, and is not limited to one node; in this way, a conflict can be detected from an overall perspective of an entire transmission path of a data flow on a network.

Embodiment 4

Figure 5:
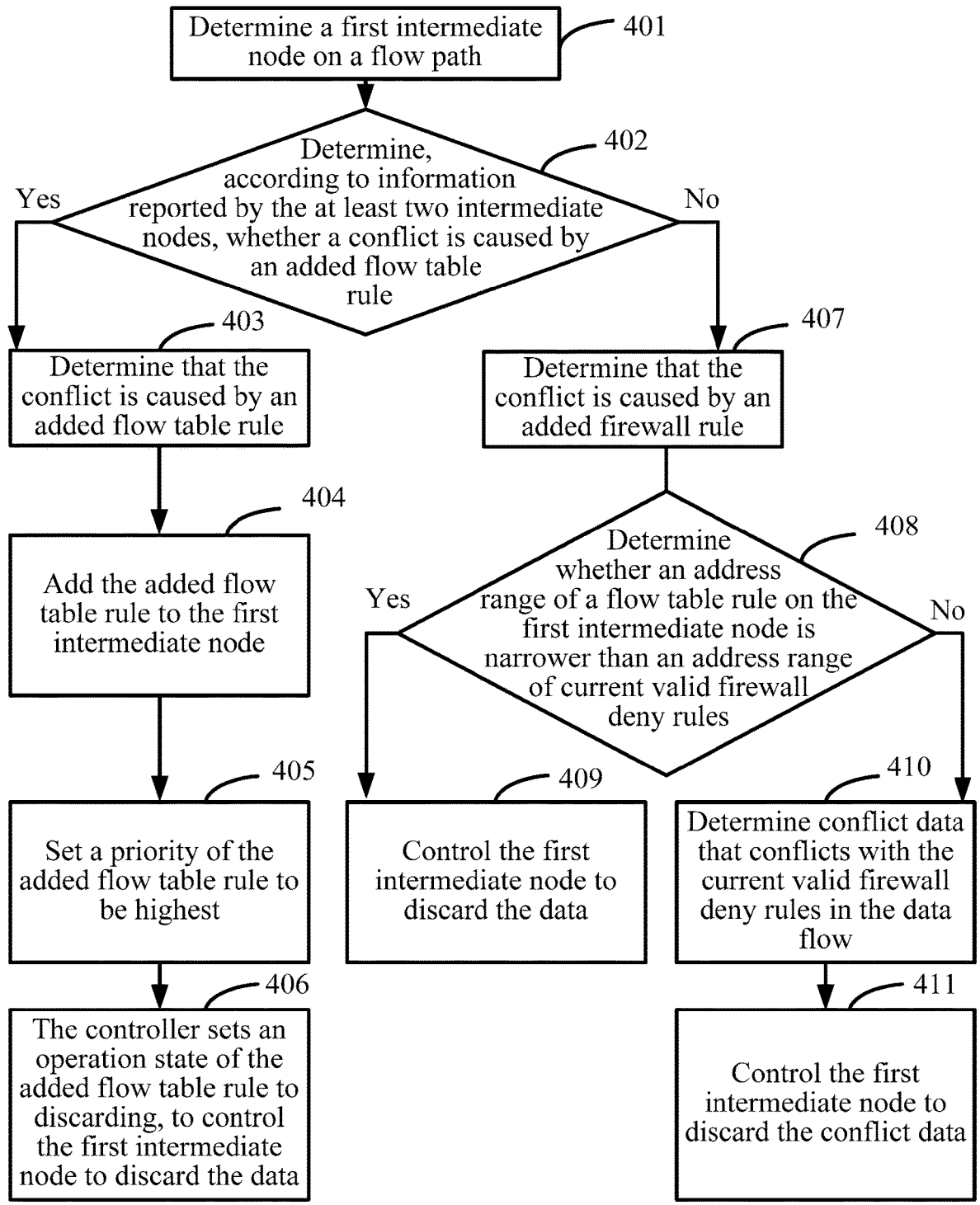
FIG. 5 shows another conflict resolution method according to an embodiment of the present invention.

As shown in FIG. 5, an embodiment of the present invention provides a conflict resolution method, where the method includes the following steps 401 to 411, and the method is executed by a controller. In the present invention, the controller, that is, the execution body, is a separate device independent of a node on a network, and may be an apparatus, a virtual machine, or a physical server, and controls communication between network nodes by using the OpenFlow protocol. This embodiment of the present invention is applicable to data transmission between nodes in the OpenFlow protocol.

401: A controller determines a first intermediate node on a flow path, where the flow path is used to indicate a path along which a data flow reaches a destination address range from a source address range through at least two intermediate nodes on the network. In this embodiment of the present invention, the nodes include a switch, a router.

402: Determine, according to information reported by the at least two intermediate nodes, whether a conflict is caused by an added flow table rule; and if a determining result is that the conflict is caused by an added flow table rule, perform the following steps 403 to 406; or if a determining result is that the conflict is not caused by an added flow table rule, perform the following steps 407 to 411, where the reported information includes whether an added flow table rule exists. A conflict type is quickly acquired by using the manner in step 402, which facilitates subsequent conflict resolution.

403: Determine that the conflict is caused by an added flow table rule.

404: The controller adds the added flow table rule to the first intermediate node.

405: The controller sets a priority of the added flow table rule to be the highest, so that when the data flow is at the first intermediate node, the added flow table rule is first executed.

406: The controller sets an operation state of the added flow table rule to discarding, to control the first intermediate node to discard the data.

In steps 404 to 406, when the conflict is caused by an added flow table rule, the added flow table rule is executed at the first intermediate node. Compared with a manner of performing blocking on a node at which a conflict occurs in the prior art, in the present invention, conflict data is blocked at the first intermediate node that the conflict data passes through on the entire network, a conflict data flow is blocked by using an association between nodes, and the conflict data is discarded at the first intermediate node, thereby effectively preventing the conflict data flow from being transmitted on the network.

407: Determine that the conflict is caused by an added firewall rule.

408: Determine whether an address range of a flow table rule on the first intermediate node is narrower than an address range of the current valid deny rules of the firewall; and if a determining result is that the address range of the flow table rule at the first intermediate node is narrower than the address range of the current valid firewall negation rules, perform the following step 409; or if a determining result is that the address range of the flow table rule at the first intermediate node is not narrower than the address range of the current valid firewall negation rules, perform the following steps 410 and 411.

409: The controller controls the first intermediate node to discard the data.

410: Determine conflict data that conflicts with the current valid deny rules of the firewall in the data flow.

411: The controller controls the first intermediate node to discard the conflict data.

In steps 408 to 411, when the conflict is caused by an added firewall rule, if the address range of the current valid deny rules of the firewall is wider than the address range of the flow table rule on the first intermediate node, the data is discarded at the first intermediate node; or if the address range of the flow table rule on the first intermediate node is wider than the address range of the current valid deny rules of the firewall, only data that conflicts with the current valid deny rules of the firewall in the data flow needs to be discarded. Compared with a manner of performing discarding on a node at which a conflict occurs in the prior art, in the present invention, a global view of a network is created, conflict data is discarded at the first intermediate node, and a conflict data flow is blocked by fully using an association between nodes, thereby effectively preventing the conflict data flow from being transmitted on the network.

This embodiment of the present invention provides a conflict resolution method, in which a first intermediate node is determined according to a flow path, and conflict data is blocked at the first intermediate node. Compared with a manner of performing blocking on a node at which a conflict occurs in the prior art, in the present invention, a global view of a network is created, conflict data is discarded at the first intermediate node, and a conflict data flow is blocked by fully using an association between nodes, thereby effectively preventing the conflict data flow from being transmitted on the network.

Embodiment 5

Figure 6:
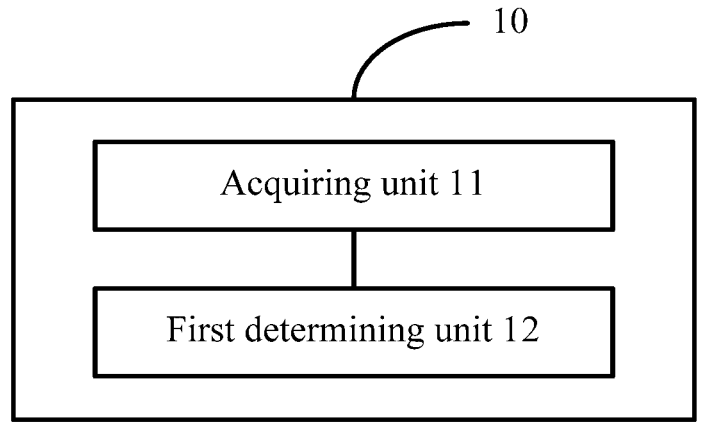
FIG. 6 shows a conflict detection apparatus according to an embodiment of the present invention.

As shown in FIG. 6, an embodiment of the present invention provides a conflict detection apparatus 10, where the apparatus 10 includes: an acquiring unit 11 and a first determining unit 12.

The acquiring unit 11 is configured to acquire a flow path of a data flow on a network, where the flow path is used to indicate a path along which the data flow reaches a destination address range from a source address range through at least two intermediate nodes on the network, a first flow table rule is added to or deleted from flow tables of the at least two intermediate nodes, the first flow table rule is any flow table rule, and the nodes include a switch, a router.

Preferably, the acquiring unit specifically includes: an acquiring module, a first generation module, and a second generation module, where the acquiring module acquires an address range of the data flow according to packet header information of the data flow; the first generation module generates, according to the address range of the data flow and current flow tables of the at least two intermediate nodes, transformation functions used to form the flow path, where the current flow tables are flow tables in which the first flow table rule is added or deleted; and the second generation module generates the flow path according to the transformation functions.

In this embodiment of the present invention, any flow table rule may be added or deleted on the at least two intermediate nodes by malicious software or by any apparatus except a controller and each node on the network. A flow table of each node on the network changes after any flow table rule is added or deleted, and consequently a rewritten transformation function is generated, and the flow path of the data flow on the network is rewritten.

The first determining unit 12 is configured to determine whether a conflict exists according to an address range of the flow path and an address range of a security policy.

This embodiment of the present invention provides a conflict detection apparatus, in which an acquiring unit acquires a flow path of a data flow on a network, where the flow path passes through at least two intermediate nodes, and a first determining unit determines whether a conflict exists. Compared with a manner of performing detection on a node at which a conflict occurs in the prior art, in this embodiment of the present invention, conflict detection is performed based on a flow path, and is not limited to one node; in this way, a conflict can be detected from an overall perspective of an entire transmission path of a data flow on a network.

Preferably, the security policy includes current firewall rules and current valid deny rules of a firewall.

Further, the first determining unit 12 includes a first determining module, and the first determining module is configured to determine whether a conflict exists according to the address range of the flow path and an address range of the current firewall rules.

Further, the first determining module is configured to determine whether the address range of the flow path and the address range of the current firewall rules have an intersection set, where if an intersection set exists, the flow path conflicts with the current firewall rules; and if no intersection set exists, the flow path does not conflict with the current firewall rules.

Further, the first determining unit further includes: a generation module; and the generation module is configured to generate the current valid deny rules of the firewall according to the current firewall rules.

Further, the first determining unit 12 further includes a second determining module, and the second determining module is configured to determine whether a conflict exists according to the address range of the flow path and an address range of the current valid deny rules of the firewall.

Further, the second determining module is configured to determine whether the address range of the flow path and the address range of the current valid deny rules of the firewall have an intersection set, where if an intersection set exists, the flow path conflicts with the current valid deny rules of the firewall; and if no intersection set exists, the flow path does not conflict with the current valid deny rules of the firewall.

Preferably, the generation module specifically includes: a classification submodule, a first judging submodule, a first operation submodule, a first determining submodule, a second judging submodule, a third judging submodule, a second operation submodule, and a second determining submodule.

The classification submodule is configured to classify the current firewall rules into a deny rule set and a permit rule set.

The first judging submodule is configured to determine whether a priority of the permit rule set is higher than a priority of the deny rule set.

The first operation submodule is configured to: when a determining result of the first judging submodule is yes, calculate an intersection set of an address range of the permit rule set and an address range of the deny rule set, to obtain a first intersection set; and acquire a difference between the deny rule set and the first intersection set, to obtain the current valid deny rules of the firewall.

The first determining submodule is configured to: when a determining result of the first judging submodule is no, determine that the deny rule set are the current valid deny rules of the firewall.

The second judging submodule is configured to: in the deny rule set, determine whether an address range of a first deny rule and an address range of a second deny rule have a second intersection set, where the first deny rule and the second deny rule are any two deny rules in the deny rule set. Specifically, in the second judging submodule, i is used to represent the first deny rule, where i=0, i++, and i<n, where n is a quantity of deny rules in the deny rule set; and j is used to represent the second deny rule, where j=i+1, j++, and j<n. That is, it is determined whether an address range of the $i^{th}$ deny rule and an address range of the $j^{th}$ deny rule have a second intersection set.

The third judging submodule is configured to: when a result of determining, by the second judging submodule, whether the first deny rule and the second deny rule have a second intersection set is yes, determine whether a priority of the first deny rule is higher than a priority of the second deny rule.

The second operation submodule is configured to: when a determining result of the third judging submodule is yes, acquire a difference between the address range of the second deny rule and the second intersection set, to obtain the current valid deny rules of the firewall; or when a determining result of the third judging submodule is no, acquire a difference between the address range of the first deny rule and the second intersection set, to obtain the current valid deny rules of the firewall.

The second determining submodule is configured to: when a determining result of the second judging submodule is no, determine that the deny rule set are the current valid deny rules of the firewall.

Figure 7:
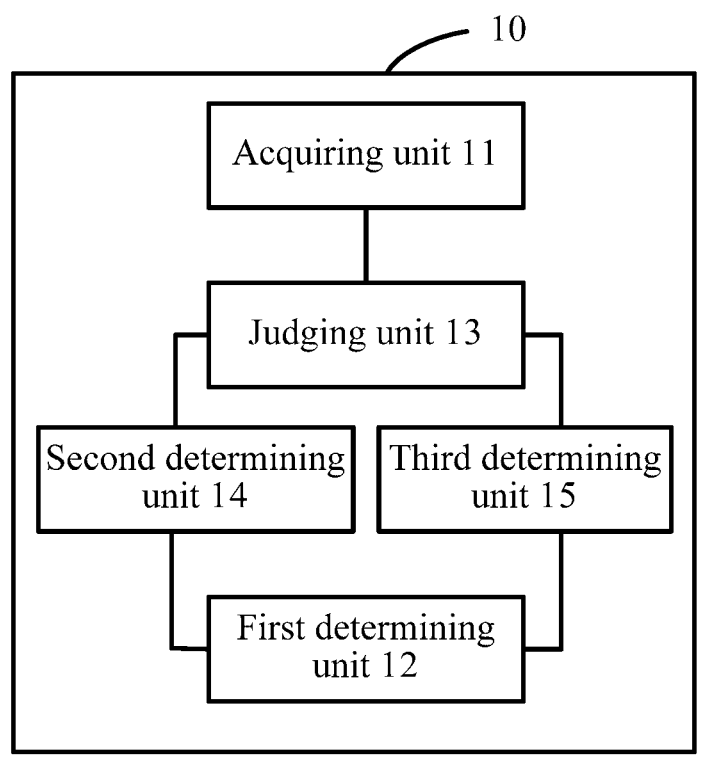
FIG. 7 shows another conflict detection apparatus according to an embodiment of the present invention.

Further, as shown in FIG. 7, the apparatus 10 further includes: a judging unit 13, a second determining unit 14, and a third determining unit 15.

The judging unit 13 is configured to determine whether a first firewall rule is to be added to or deleted from firewall rules, where the first firewall rule is any firewall rule. In this embodiment of the present invention, any firewall rule may be added or deleted, and after any firewall rule is added or deleted, firewall rules change, that is, the current firewall rules change, which affects conflict detection.

The second determining unit 14 is configured to: if a determining result of the judging unit is yes, determine that firewall rules after the first firewall rule is added or deleted are the current firewall rules.

The third determining unit 15 is configured to: if a determining result of the judging unit is no, determine that the firewall rules are the current firewall rules.

In this embodiment of the present invention, the address range of the flow path, the address range of the current firewall rules, the address range of the current valid deny rules of the firewall, the address range of the permit rule set, the address range of the deny rule set, the address range of the first deny rule, and the address range of the second deny rule all include a source address range and/or a destination address range. According to a rule in the protocol, it may be that only address ranges of source address ranges are compared, or only address ranges of destination address ranges are compared, or address ranges of source address ranges and address ranges of destination address ranges are simultaneously compared.

It can be seen that a flow path of a data flow on a network is acquired, and the first determining module determines whether an address range of the flow path and an address range of current firewall rules have an intersection set, to detect a conflict, or the second determining module determines whether an address range of the flow path and an address range of current valid deny rules of a firewall have an intersection set, to detect a conflict. Compared with a manner of performing detection on a node at which a conflict occurs in the prior art, in this embodiment of the present invention, conflict detection is performed based on a change in a flow path, and is not limited to one node; in this way, a conflict can be detected from an overall perspective of an entire transmission path of a data flow on a network.

Embodiment 6

Figure 8:
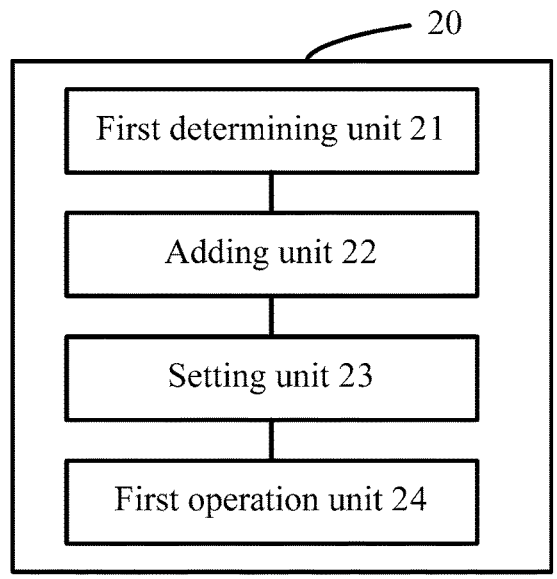
FIG. 8 shows a conflict resolution apparatus according to an embodiment of the present invention.

An embodiment of the present invention provides a conflict resolution apparatus 20, where the apparatus 20 is connected to the conflict detection apparatus 10. As shown in FIG. 8, the conflict resolution apparatus includes: a first determining unit 21, an adding unit 22, a setting unit 23, and a first operation unit 24.

The first determining unit 21 is configured to determine a first intermediate node on a flow path, where the flow path is used to indicate a path along which a data flow reaches a destination address range from a source address range through at least two intermediate nodes on the network. In this embodiment of the present invention, the nodes include a switch, a router.

The adding unit 22 is configured to: when a conflict is caused by an added flow table rule, add the added flow table rule to the first intermediate node.

The setting unit 23 is configured to set a priority of the added flow table rule to be the highest, so that when the data flow is at the first intermediate node, the added flow table rule is first executed.

The first operation unit 24 is configured to set an operation state of the added flow table rule to discarding, to control the first intermediate node to discard the data.

In this way, in the conflict resolution apparatus provided in this embodiment of the present invention, the first determining unit determines a first intermediate node; and when a conflict is caused by an added flow table rule, the first operation unit executes the added flow table rule on the first intermediate node. That is, conflict data is blocked at the first intermediate node that the conflict data passes through on an entire network; and compared with a manner of performing blocking on a node at which a conflict occurs in the prior art, a global view of a network is created, and conflict data is blocked by fully using an association between nodes.

Figure 9:
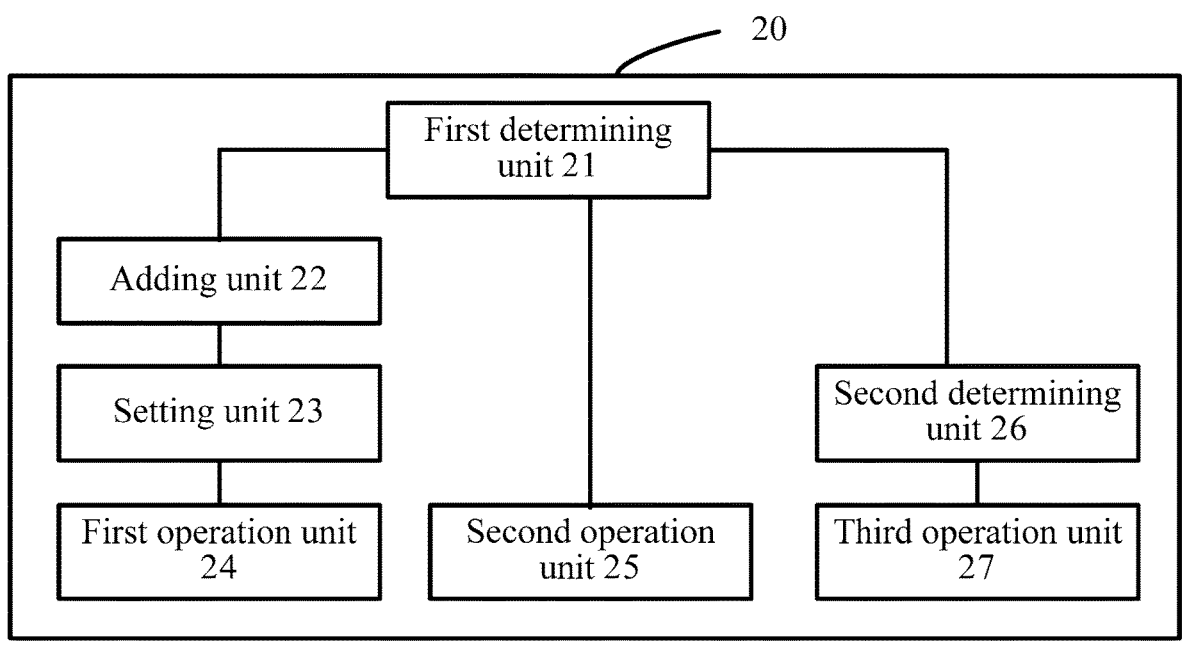
FIG. 9 shows another conflict resolution apparatus according to an embodiment of the present invention.

Preferably, as shown in FIG. 9, the apparatus 20 further includes: a second operation unit 25, a second determining unit 26, and a third operation unit 27.

The second operation unit 25 is configured to: when a conflict is caused by an added firewall rule, when an address range of a flow table rule on the first intermediate node is narrower than an address range of current valid deny rules of a firewall, control the first intermediate node to discard the data.

The second determining unit 26 is configured to: when an address range of a flow table rule on the first intermediate node is wider than an address range of current valid deny rules of a firewall, determine conflict data that conflicts with the current valid deny rules of the firewall in the data flow.

The third operation unit 27 is configured to control the first intermediate node to discard the conflict data.

Figure 10:
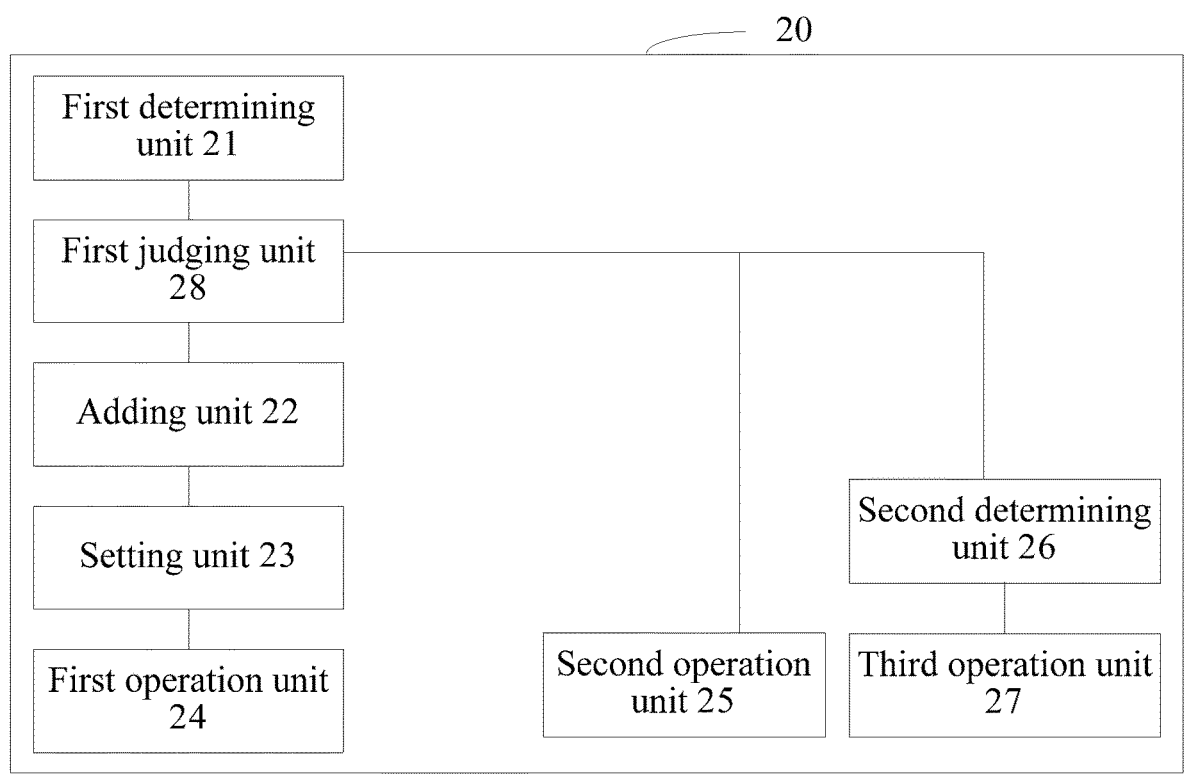
FIG. 10 shows still another conflict resolution apparatus according to an embodiment of the present invention.

Further, as shown in FIG. 10, the apparatus 20 further includes: a first judging unit 28.

The first judging unit 28 is configured to determine, according to information reported by the at least two intermediate nodes, whether a conflict is caused by an added flow table rule; and if a determining result is yes, determine that the conflict is caused by an added flow table rule; or if a determining result is no, determine that the conflict is caused by an added firewall rule.

Figure 11:
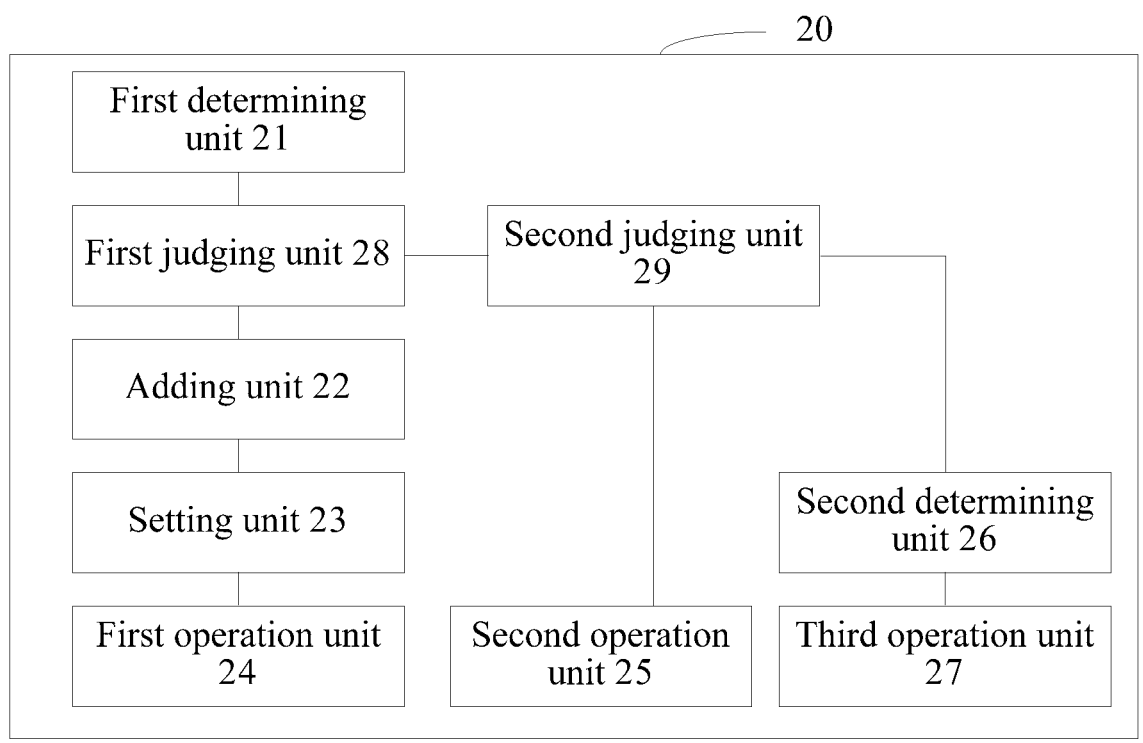
FIG. 11 shows yet another conflict resolution apparatus according to an embodiment of the present invention.

Further, as shown in FIG. 11, the apparatus 20 further includes: a second judging unit 29.

The second judging unit is configured to: when a result of the first judging unit is no, determine whether an address range of a flow table rule on the first intermediate node is narrower than an address range of the current valid deny rules of the firewall.

In this way, the first determining unit determines a first intermediate node; when a conflict is caused by an added firewall rule, if an address range of current valid deny rules of a firewall is wider than an address range of a flow table rule on the first intermediate node, the second operation unit discards the data flow on the first intermediate node; or if an address range of a flow table rule on the first intermediate node is wider than an address range of current valid deny rules of a firewall, the third operation unit discards conflict data. Compared with a manner of discarding data on a node at which a conflict occurs in the prior art, in this embodiment of the present invention, a global view of a network is created based on a flow path, a conflict is resolved at the first intermediate node, and a conflict data flow is blocked by fully using an association between nodes, thereby effectively preventing the conflict data flow from being transmitted on the network.

Embodiment 7

An embodiment of the present invention provides a conflict detection apparatus, where the apparatus includes: a processor.

The processor is configured to acquire a flow path of a data flow on a network, where the flow path is used to indicate a path along which the data flow reaches a destination address range from a source address range through at least two intermediate nodes on the network, a first flow table rule is added to or deleted from flow tables of the at least two intermediate nodes, and the first flow table rule is any flow table rule. The processor is configured to acquire an address range of the data flow according to packet header information of the data flow; generate, according to the address range of the data flow and current flow tables of the at least two intermediate nodes, transformation functions used to form the flow path, where the current flow tables are flow tables in which the first flow table rule is added or deleted; and generate the flow path according to the transformation functions.

The processor is configured to determine whether a conflict exists according to an address range of the flow path and an address range of a security policy.

Preferably, the security policy includes current firewall rules and current valid deny rules of a firewall.

The processor is further configured to determine whether a conflict exists according to the address range of the flow path and an address range of the current firewall rules.

The processor is configured to determine whether the address range of the flow path and the address range of the current firewall rules have an intersection set, where if an intersection set exists, the flow path conflicts with the current firewall rules; and if no intersection set exists, the flow path does not conflict with the current firewall rules.

Further, the processor is configured to generate the current valid deny rules of the firewall according to the current firewall rules. Further, the processor is configured to:

classify the current firewall rules into a deny rule set and a permit rule set;

determine whether a priority of the permit rule set is higher than a priority of the deny rule set;

if a determining result is yes, calculate an intersection set operation of an address range of the permit rule set and an address range of the deny rule set, to obtain a first intersection set;

acquire a difference between the deny rule set and the first intersection set, to obtain the current valid deny rules of the firewall; or if a determining result is no, determine that the deny rule set are the current valid deny rules of the firewall; or in the deny rule set, determine whether an address range of a first deny rule and an address range of a second deny rule have a second intersection set, where the first deny rule and the second deny rule are any two deny rules in the deny rule set;

if the address range of the first deny rule and the address range of the second deny rule have a second intersection set, determine whether a priority of the first deny rule is higher than a priority of the second deny rule;

if a determining result is yes, acquire a difference between the address range of the second deny rule and the second intersection set, to obtain the current valid deny rules of the firewall; or if a determining result is no, acquire a difference between the address range of the first deny rule and the second intersection set, to obtain the current valid deny rules of the firewall; or if the address range of the first deny rule and the address range of the second deny rule have no second intersection set, determine that the deny rule set are the current valid deny rules of the firewall.

Further, the processor is configured to determine whether a conflict exists according to the address range of the flow path and an address range of the current valid deny rules of the firewall.

The processor is configured to determine whether the address range of the flow path and the address range of the current valid deny rules of the firewall have an intersection set, where if an intersection set exists, the flow path conflicts with the current valid deny rules of the firewall; and if no intersection set exists, the flow path does not conflict with the current valid deny rules of the firewall.

Further, the processor is configured to determine whether a first firewall rule is to be added to or deleted from firewall rules, where the first firewall rule is any firewall rule; and when the determining result is yes, determine that firewall rules after the first firewall rule is added or deleted are the current firewall rules; or when a determining result is no, determine that the firewall rules are the current firewall rules.

The address range of the flow path, the address range of the current firewall rules, the address range of the current valid deny rules of the firewall, the address range of the permit rule set, the address range of the deny rule set, the address range of the first deny rule, and the address range of the second deny rule all include a source address range and/or a destination address range.

This embodiment of the present invention provides a conflict detection apparatus, in which a flow path of a data flow on a network is acquired, and whether a conflict exists is determined according to an address range of the flow path and an address range of a security policy. Compared with a manner of performing detection on a node at which a conflict occurs in the prior art, in this embodiment of the present invention, conflict detection is performed based on a change in a flow path, and is not limited to one node; in this way, a conflict can be detected from an overall perspective of an entire transmission path of a data flow on a network.

An embodiment of the present invention further provides a conflict resolution apparatus, connected to the foregoing conflict detection apparatus, where the conflict resolution apparatus includes: a processor.

The processor is configured to determine a first intermediate node on a flow path, where the flow path is used to indicate a path along which a data flow reaches a destination address range from a source address range through at least two intermediate nodes on the network; and when a conflict is caused by an added flow table rule, add the added flow table rule to the first intermediate node;

set a priority of the added flow table rule to be the highest, so that when the data flow is at the first intermediate node, the added flow table rule is first executed; and set an operation state of the added flow table rule to discarding, to control the first intermediate node to discard the data.

Further, the processor is configured to: when a conflict is caused by an added firewall rule, when an address range of a flow table rule on the first intermediate node is narrower than an address range of current valid deny rules of a firewall, control the first intermediate node to discard the data; or when an address range of a flow table rule on the first intermediate node is wider than an address range of current valid deny rules of a firewall, determine conflict data that conflicts with the current valid deny rules of the firewall in the data flow; and control the first intermediate node to discard the conflict data.

Further, the processor is further configured to determine, according to information reported by the at least two intermediate nodes, whether a conflict is caused by an added flow table rule; and if a determining result is yes, determine that the conflict is caused by an added flow table rule; or if a determining result is no, determine that the conflict is caused by an added firewall rule; and when the determining result is no, determine whether an address range of a flow table rule on the first intermediate node is narrower than an address range of the current valid deny rules of the firewall.

This embodiment of the present invention provides a conflict resolution apparatus, in which a first intermediate node on a flow path of a data flow is determined according to the flow path, and when a conflict is caused by an added flow table rule, the added flow table rule is executed on the first intermediate node. Compared with a manner of performing blocking on a node at which a conflict occurs in the prior art, conflict data is blocked at the first intermediate node that the conflict data passes through on an entire network, and the conflict data is discarded at the first intermediate node, thereby effectively preventing a conflict data flow from being transmitted on the network.

It should be noted that the terms "first" and "second" used in the description in the foregoing embodiments do not intend to limit a sequence, and are only for the purpose of convenient distinguishing.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing technical solutions in accordance with the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A conflict resolution method implemented by a controller in a software defined network, comprising:
   acquiring, by the controller, a flow path of a data flow on the software defined network, the flow path including at least two intermediate nodes;
   determining, by the controller, the first intermediate node in the at least two intermediate nodes the data flow passes on the flow path;
   determining whether there is a conflict according to an address range of the flow path and an address range of a security policy, wherein the security policy comprises current valid deny rules of a firewall;
   when it is determined that the conflict is caused by an added firewall rule, and an address range of a flow table rule in the first intermediate node is narrower than an address range of the current valid deny rules of a firewall, controlling, by the controller, the first intermediate node to discard the data flow;
   determining, by the controller, whether the conflict between the flow path and the security policy is caused by a to-be-added flow table rule,
   when it is determined that the conflict is caused by the to-be-added flow table rule, adding, by the controller, the to-be-added flow table rule to the first intermediate node;
   setting, by the controller, a priority of the added to-be-added flow table rule as a highest priority to cause the added to-be-added flow table rule to be first executed at the first intermediate node when the data flow is at the first intermediate node; and
   setting, by the controller, an operation state of the added flow table rule to discarding, to control the first intermediate node to discard the data flow.

2. The method of claim 1, further comprising, after determining, by the controller, the first intermediate node on the flow path:
   when it is determined that the address range of the flow table rule in the first intermediate node is wider than the address range of current valid deny rules of the firewall, determining, by the controller, conflict data that conflicts with the current valid deny rules of the firewall in the data flow; and
   controlling, by the controller, the first intermediate node to discard the conflict data.

3. The method of claim 1, further comprising, after determining that the conflict is caused by the added firewall rule: determining whether an address range of a flow table rule on the first intermediate node is narrower than the address range of current valid deny rules of the firewall.

4. The method of claim 1, further comprising:
   controlling the first intermediate node to discard data when a conflict is caused by the added firewall rule and when the address range of the flow table rule on the first intermediate node is narrower than the address range of current valid deny rules of a firewall.

5. The method of claim 1, further comprising:
   discarding conflict data at the first intermediate node.

6. The method of claim 1, further comprising:
   determining conflict data that conflicts with current valid deny rules of the firewall in the data flow when the address range of the flow table rule in the first intermediate node is wider than the address range of the current valid deny rules of the firewall.

7. A conflict resolution apparatus for implementing a controller of a software defined network, comprising:
   a computer-readable non-transitory storage medium storing instructions; and
   one or more processors in communication with the computer-readable non-transitory storage medium, wherein the instructions, when executed by the one or more processors, cause the one or more processors to:
   acquire a flow path of a data flow on the software defined network, the flow path including at least two intermediate nodes;
   determine the first intermediate node in the at least two intermediate nodes the data flow passes on the flow path;
   determine whether there is a conflict according to an address range of the flow path and an address range of a security policy, wherein the security policy comprises current valid deny rules of a firewall;
   when the conflict is caused by an added firewall rule, control the first intermediate node to discard the data flow when an address range of a flow table rule in the first intermediate node is narrower than an address range of current valid deny rules of a firewall;

determine whether the conflict between the flow path and the security policy is caused by a to-be-added flow table rule, add the to-be-added flow table rule to the first intermediate node when it is determined that the conflict is caused by the to-be-added flow table rule;

set a priority of the added to-be-added flow table rule as a highest priority to cause the added flow table rule to be first executed at the first intermediate node when the data flow is at the first intermediate node; and set an operation state of the added to-be-added flow table rule to discarding, to control the first intermediate node to discard the data flow.

8. The conflict resolution apparatus of claim 7, wherein the instructions further cause the one or more processors to, after determining the first intermediate node on the flow path:

determine conflict data that conflicts with the current valid deny rules of the firewall in the data flow when the address range of the flow table rule in the first intermediate node is wider than the address range of current valid deny rules of the firewall; and control the first intermediate node to discard the conflict data.

9. The conflict resolution apparatus of claim 7, wherein the instructions further cause the one or more processors to, after determining that the conflict is caused by the added firewall rule, determine whether the address range of the flow table rule on the first intermediate node is narrower than the address range of current valid deny rules of the firewall.

10. The conflict resolution apparatus of claim 7, wherein the first intermediate node comprises a switch.

11. The conflict resolution apparatus of claim 7, wherein the first intermediate node comprises a router.

12. The conflict resolution apparatus of claim 7, wherein the instructions further cause the one or more processors to control the first intermediate node to discard data when the conflict was caused by the added firewall rule and when the address range of the flow table rule on the first intermediate node is narrower than an address range of current valid deny rules of the firewall.

13. The conflict resolution apparatus of claim 7, wherein the instructions further cause the one or more processors to discard conflict data at the first intermediate node.

14. The conflict resolution apparatus of claim 7, wherein the instructions further cause the one or more processors to determine conflict data that conflicts with current valid deny rules of the firewall in the data flow when the address range of the flow table rule in the first intermediate node is wider than the address range of the current valid deny rules of the firewall.

* * * * *